(12) United States Patent
Phan et al.

(10) Patent No.: US 12,513,593 B2
(45) Date of Patent: Dec. 30, 2025

(54) CONTROL OF UPLINK DATA SPLIT FROM REMOTE USER EQUIPMENT OVER MULTIPATH

(71) Applicant: NOKIA TECHNOLOGIES OY, Espoo (FI)

(72) Inventors: Vinh Van Phan, Oulu (FI); SunYoung Lee, Seoul (KR); Faranaz Sabouri-Sichani, Aalborg (DK); Ling Yu, Kauniainen (FI); György Tamás Wolfner, Budapest (HU)

(73) Assignee: NOKIA TECHNOLOGIES OY, Espoo (FI)

( * ) Notice: Subject to any disclaimer, the term of this patent is extended or adjusted under 35 U.S.C. 154(b) by 424 days.

(21) Appl. No.: 18/104,534

(22) Filed: Feb. 1, 2023

(65) Prior Publication Data

US 2024/0259909 A1    Aug. 1, 2024

(51) Int. Cl.
*H04W 40/02* (2009.01)
*H04L 45/243* (2022.01)
*H04W 88/04* (2009.01)

(52) U.S. Cl.
CPC ........... *H04W 40/02* (2013.01); *H04L 45/243* (2022.05); *H04W 88/04* (2013.01)

(58) Field of Classification Search
None
See application file for complete search history.

(56) References Cited

U.S. PATENT DOCUMENTS

| | | | | |
|---|---|---|---|---|
| 2022/0322078 A1* | 10/2022 | Xu | ........................ | H04W 76/15 |
| 2023/0171825 A1* | 6/2023 | Kuo | ........................ | H04W 76/19 370/315 |
| 2023/0354152 A1* | 11/2023 | Bangolae | .............. | H04W 40/22 |
| 2024/0064605 A1* | 2/2024 | Lin | ........................ | H04W 76/15 |
| 2024/0178984 A1* | 5/2024 | Miao | .................... | H04L 5/0053 |

OTHER PUBLICATIONS

Extended European Search Report, corresponding to EP Application No. 24150335.8, dated Jun. 25, 2024.
OPPO, "Discussion on multi-path SL relay", 3GPP TSG-RAN WG2 #119bis-e, E-meeting, Oct. 2022, R2-2210780, 12 pages.

* cited by examiner

*Primary Examiner* — Brian S Roberts
(74) *Attorney, Agent, or Firm* — SQUIRE PATTON BOGGS (US) LLP

(57) ABSTRACT

Systems, methods, apparatuses, and computer program products for controlling the PDCP level data split from a remote UE over MP. One method may include a user equipment, receiving a message from a network entity comprising an indication of a path control via a configured grant, and, based at least in part on the indication of the path control via the configured grant, performing data transmission over at least one of a direct path with the network entity and an indirect path with the network entity via a relay user equipment.

16 Claims, 6 Drawing Sheets

CONTROL OF UPLINK DATA SPLIT FROM REMOTE USER EQUIPMENT OVER MULTIPATH

TECHNICAL FIELD

Some example embodiments may generally relate to mobile or wireless telecommunication systems, such as 3$^{rd}$ Generation Partnership Project (3GPP) Long Term Evolution (LTE), 5$^{th}$ generation (5G) radio access technology (RAT), new radio (NR) access technology, 6$^{th}$ generation (6G), and/or other communications systems. For example, certain example embodiments may relate to systems and/or methods for controlling the physical data convergence protocol (PDCP) level data split from a remote user equipment (UE) over multipath (MP).

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the radio access network (RAN) for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include receiving, by a user equipment, a message from a network entity including an indication of a path control via a configured grant. The method may further include, based at least in part on the indication of the path control via the configured grant, performing, by the user equipment, data transmission over at least one of a direct path with the network entity and an indirect path with the network entity via a relay user equipment.

In accordance with certain example embodiments, an apparatus may include means for receiving a message from a network entity including an indication of a path control via a configured grant. The apparatus may further include means for, based at least in part on the indication of the path control via the configured grant, performing data transmission over at least one of a direct path with the network entity and an indirect path with the network entity via a relay user equipment.

In accordance with various example embodiments, a non-transitory computer readable medium may include program instructions that, when executed by an apparatus, cause the apparatus to perform at least a method. The method may include receiving a message from a network entity including an indication of a path control via a configured grant. The method may further include, based at least in part on the indication of the path control via the configured grant, performing data transmission over at least one of a direct path with the network entity and an indirect path with the network entity via a relay user equipment.

In accordance with some example embodiments, a computer program product may perform a method. The method may include receiving a message from a network entity including an indication of a path control via a configured grant. The method may further include, based at least in part on the indication of the path control via the configured grant, performing data transmission over at least one of a direct path with the network entity and an indirect path with the network entity via a relay user equipment.

In accordance with certain example embodiments, an apparatus may include at least one processor and at least one memory storing instructions that, when executed by the at least one processor, cause the apparatus at least to receive a message from a network entity including an indication of a path control via a configured grant. The at least one memory and instructions, when executed by the at least one processor, may further cause the apparatus at least to, based at least in part on the indication of the path control via the configured grant, perform data transmission over at least one of a direct path with the network entity and an indirect path with the network entity via a relay user equipment.

In accordance with various example embodiments, an apparatus may include receiving circuitry configured to perform receive a message from a network entity including an indication of a path control via a configured grant. The apparatus may further include performing circuitry configured to perform, based at least in part on the indication of the path control via the configured grant, data transmission over at least one of a direct path with the network entity and an indirect path with the network entity via a relay user equipment.

In accordance with some example embodiments, a method may include transmitting, by a network entity, a message to a remote user equipment including an indication of a path control via a configured grant. The method may further include receiving, by the network entity, based at least in part on the indication of the path control via the configured grant, data transmission over at least one of a direct path with the remote user equipment and an indirect path with the remote user equipment via a relay user equipment.

In accordance with certain example embodiments, an apparatus may include means for transmitting a message to a remote user equipment including an indication of a path control via a configured grant. The apparatus may further include means for receiving based at least in part on the indication of the path control via the configured grant, data transmission over at least one of a direct path with the remote user equipment and an indirect path with the remote user equipment via a relay user equipment.

In accordance with various example embodiments, a non-transitory computer readable medium may include program instructions that, when executed by an apparatus, cause the apparatus to perform at least a method. The method may include transmitting a message to a remote user equipment including an indication of a path control via a configured grant. The method may further include receiving based at least in part on the indication of the path control via the configured grant, data transmission over at least one of a direct path with the remote user equipment and an indirect path with the remote user equipment via a relay user equipment.

In accordance with some example embodiments, a computer program product may perform a method. The method may include transmitting a message to a remote user equipment including an indication of a path control via a configured grant. The method may further include receiving based at least in part on the indication of the path control via the configured grant, data transmission over at least one of a direct path with the remote user equipment and an indirect path with the remote user equipment via a relay user equipment.

In accordance with certain example embodiments, an apparatus may include at least one processor and at least one memory storing instructions that, when executed by the at least one processor, cause the apparatus at least to transmit a message to a remote user equipment including an indication of a path control via a configured grant. The at least one memory and instructions, when executed by the at least one processor, may further cause the apparatus at least to receive based at least in part on the indication of the path control via the configured grant, data transmission over at least one of a direct path with the remote user equipment and an indirect path with the remote user equipment via a relay user equipment.

In accordance with various example embodiments, an apparatus may include transmitting circuitry configured to perform transmitting a message to a remote user equipment including an indication of a path control via a configured grant. The apparatus may further include receiving circuitry configured to perform receiving based at least in part on the indication of the path control via the configured grant, data transmission over at least one of a direct path with the remote user equipment and an indirect path with the remote user equipment via a relay user equipment.

BRIEF DESCRIPTION OF THE DRAWINGS

For a proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for controlling the physical data convergence protocol level data split from a remote user equipment over MP is not intended to limit the scope of certain example embodiments, but is instead representative of selected example embodiments.

Figure 1:
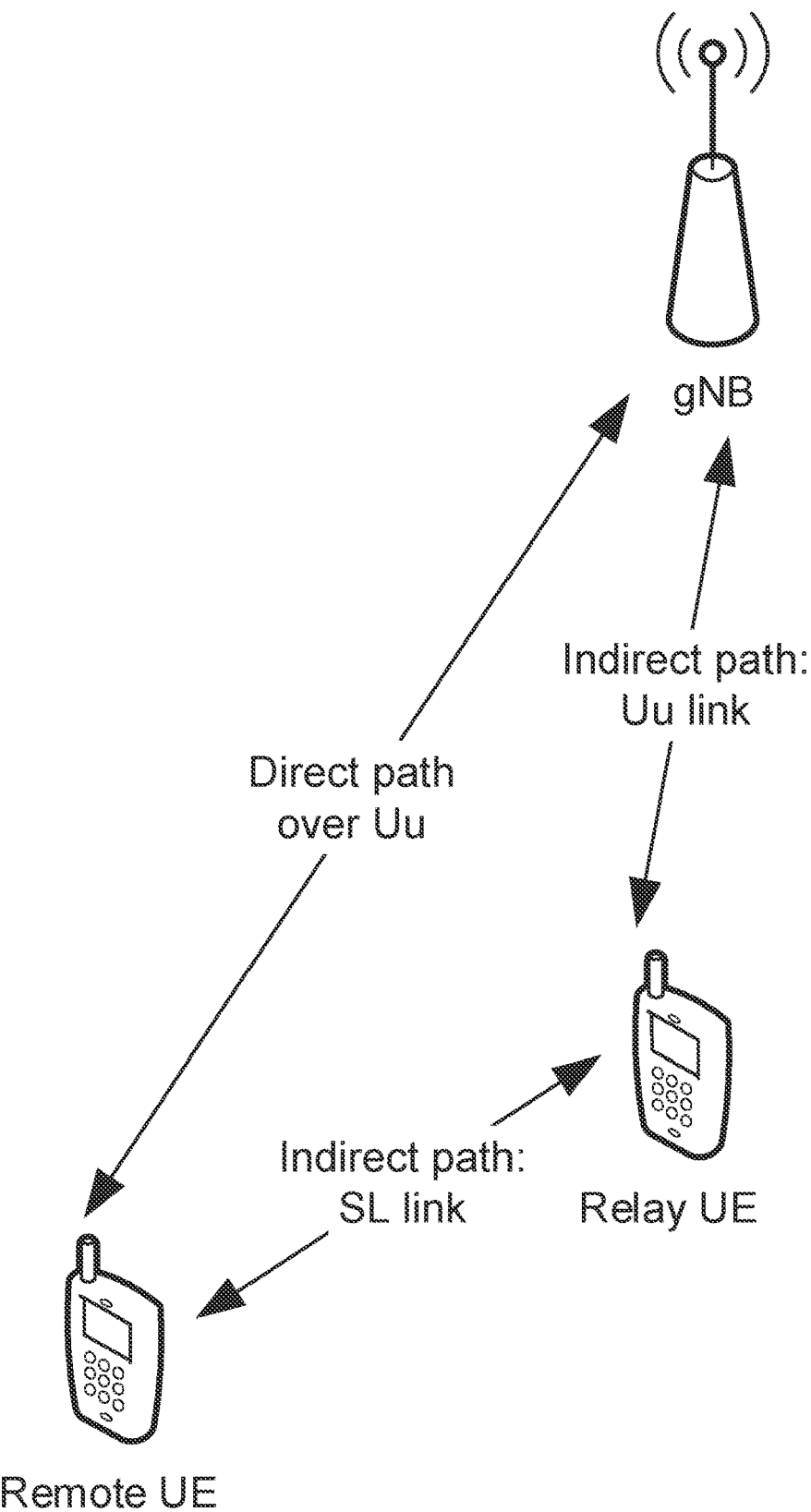
FIG. 1 illustrates an example of MP functionality for a remote UE.

FIG. 1 depicts an example of Third Generation Partnership Project (3GPP) Release (Rel)-18 MP, in which a remote UE is connected to its serving network entity (NE) through a direct path over Uu (i.e., radio interface that connects the UE to the NE), and an indirect path via a layer 2 (L2) user equipment-to-network (U2N) relay.

In one scenario, a UE may be connected to the same NE using one direct path and one indirect path via 1) L2 U2N relay, or 2) another UE (where the UE-to-UE (U2U) interconnection is assumed to be ideal), where the L2 U2N relay may be reused for the indirect path via another UE without precluding the possibility of excluding a part of the solution which is unnecessary for the operation the indirect path via another UE. U2N relay in scenario 1 may reuse the Rel-17 solution as the baseline. In addition, support of L3 U2N relay in MP scenarios may be assumed to have no impact on RAN.

Rel-18 MP with a direct path and an indirect path, via a L2 U2N relay UE between a remote UE and a serving NE, may be used to boost data rate and/or enhance reliability for data transmissions of the remote UE in, for example, cell-edge scenarios, based on data split or duplication over the direct and indirect paths. In 3GPP, PDCP-level data split or duplication may be used as the baseline for MP, as in the current multi-connectivity (MC).

However, UE in MC may be connected to different NEs (i.e., master node (MgNB or MN) and/or secondary node (SgNB or SN)), and uplink (UL) data transmissions below PDCP level towards the MgNB and SgNB over respective Uu links may be independently controlled and scheduled by the MgNB and SgNB. The UE in MC may generate buffer status reports (BSR) and scheduling requests (SR) over respective Uu links independently, while the PDCP layer may perform data split/duplication for respective Uu links prior to, or independently from, BSR and SR on medium access control (MAC) and physical (PHY) layers. The data split on PDPC layer may be based on, for example, a pre-configured data volume threshold (e.g., ul-DataSplit-Threshold) on a first connection configured as the primary connection so that data exceeding the data volume threshold may be transmitted on a second connection configured as the secondary connection. The configuration and control of the data split/duplication in MC may be based on radio resource control (RRC) signalling from the MgNB with possible coordination between the MgNB and the SgNB over Xn application protocol (XnAP) (i.e., link providing control plane signalling between two NG-RAN nodes in NG-RAN over Xn interface) which may not be expected to be fast and dynamic. Thus, the data split in MC may be unable to adapt to fast or sudden changes of resource and/or channel conditions towards the MgNB and the SgNB. In other words, the data split may need to be performed according to the configuration for the primary and secondary connections regardless of changes of resource or channel conditions towards the MgNB and the SgNB.

In MP, since the direct and indirect paths are controlled by the same NE, fast and dynamic control of the data split from the remote UE over MP (as opposed to slow and semi-static control of the data split using RRC reconfiguration of the data volume threshold in MC) for an efficient utilization of resources, including radio resources for the direct path and indirect path as well as battery power resources for the remote UE, may be possible and practical. For the indirect path, the remote UE may not need to perform BSR to serving NE since sidelink (SL) mode 2 (e.g., UE may autonomously select resources from a configured resource pool for SL transmissions, in contrast to mode 1 in which the serving NE may schedule and allocate resources for SL transmissions of the UE) may be used for SL transmissions from the remote UE on the indirect path as much as possible, provided that shared mode 2 resources are available which can be selected by the remote UE from one or more configured resource pools. It is noted that data transmissions over an Uu interface between the UE and NE may be scheduled by the NE. In MC, the MgNB and SgNB may schedule and allocate resources for data transmissions of the UE over the primary and secondary connections independently.

Reusing MC mechanisms related to data split for MP may prevent possible enhancements in MP where the NE is able to control the data split from the remote UE over MP faster and more efficiently based on, for example, actual resource allocation rather than the data volume threshold with semi-static primary-secondary connection configuration. Thus, MP solutions are needed to utilize the resources more efficiently considering radio link conditions on each path as well as UE power consumption constraints.

Certain example embodiments described herein may have various benefits and/or advantages to overcome the disadvantages described above. One benefit to MP enhancement of performance for the remote UE being at the cell edge or prone to direct Uu coverage issue and/or having critical limitations in terms of power consumption. For example, some embodiments discussed below may address these limitations, as well as create possibilities to provide resources over direct path and indirect path considering the radio link conditions and UE power consumption. Certain embodiments may provide a fast and efficient control of UL data split from the remote UE to the serving NE over MP based on actual resource allocation rather than the data volume threshold, eliminating the need for the primary-secondary connection (path) configuration as well as slow adaptation thereof. For example, when SL resource and/or channel conditions are favorable or Uu resource and/or channel conditions are unfavorable the indirect path may be utilized as much as possible, for example, avoiding the data split, for better resource utilization including power saving for the remote UE. Some embodiments may utilize existing L1 signalling (activation/deactivation of a configured grant (CG) in downlink control information (DCI) sent on physical downlink control channel (PDCCH)) to minimize overhead and standardization impact. Thus, certain example embodiments discussed below are directed to improvements in computer-related technology.

Described herein are effective methods for controlling the PDCP level data split from a remote UE over MP, including a direct path and an indirect path via a L2 U2N relay UE, to a serving NE via an allocation of a CG and activation/deactivation of the allocated CG thereof to the remote UE. It is noted that, although the description from here on mainly considers that the CG comprises an UL CG configured to transmit MP data from a MP split radio bearer (RB) of the remote UE over the direct path, the CG may comprise one or more UL CG; and/or one or more SL CG configured to transmit MP data from the MP split RB of the remote UE between the remote UE and the U2N relay UE over the indirect path. Then various embodiments may be adapted for the case that the CG comprises a SL CG or the case that there are more than one UL CGs for examples. Various embodiments may include triggers or conditions for the remote UE to send or not to send a SR/BSR to the NE, depending on activation/deactivation of the UL CG.

Figure 2:
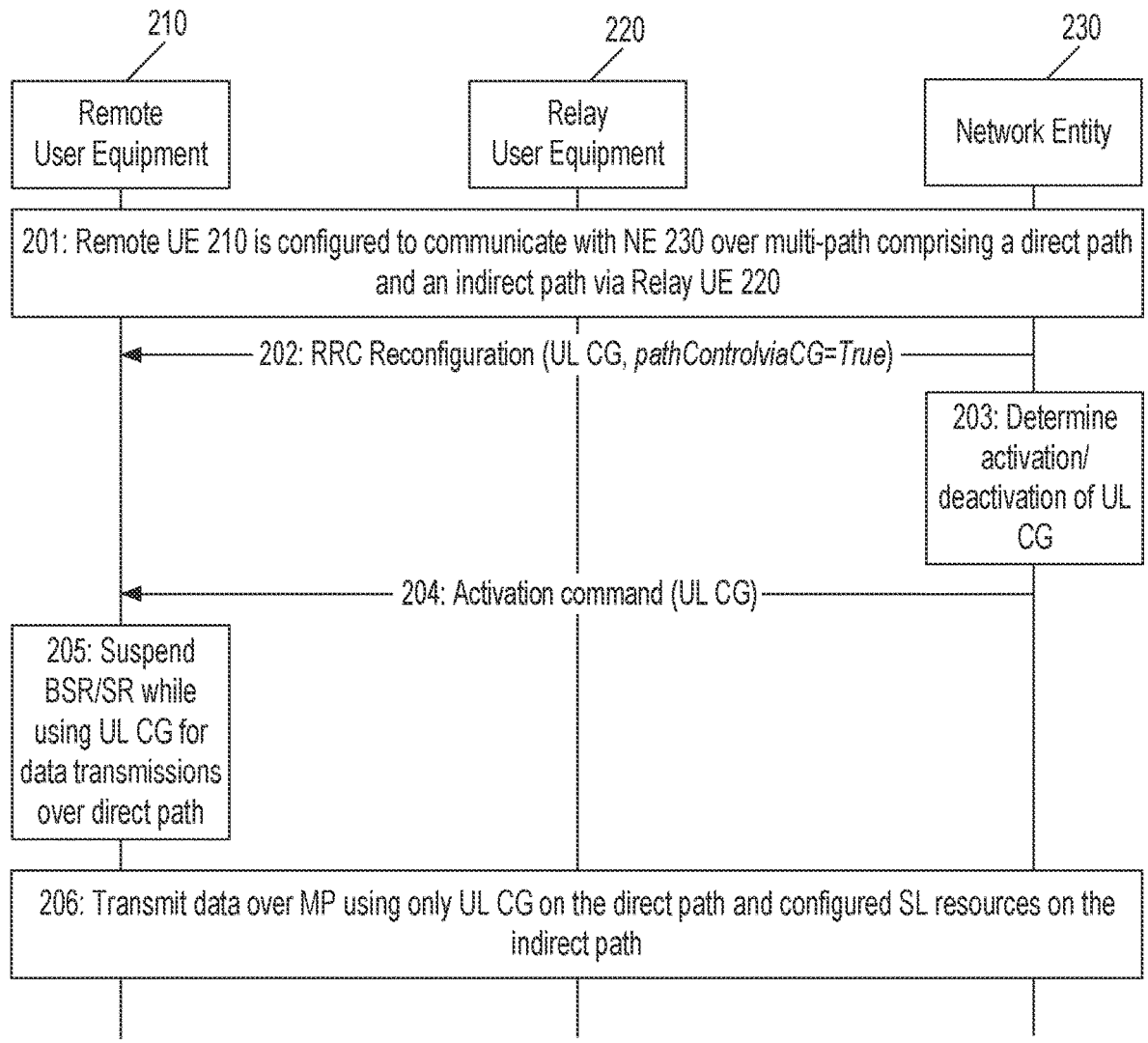
FIG. 2 illustrates an example of a signaling diagram according to certain example embodiments.
Figure 5:
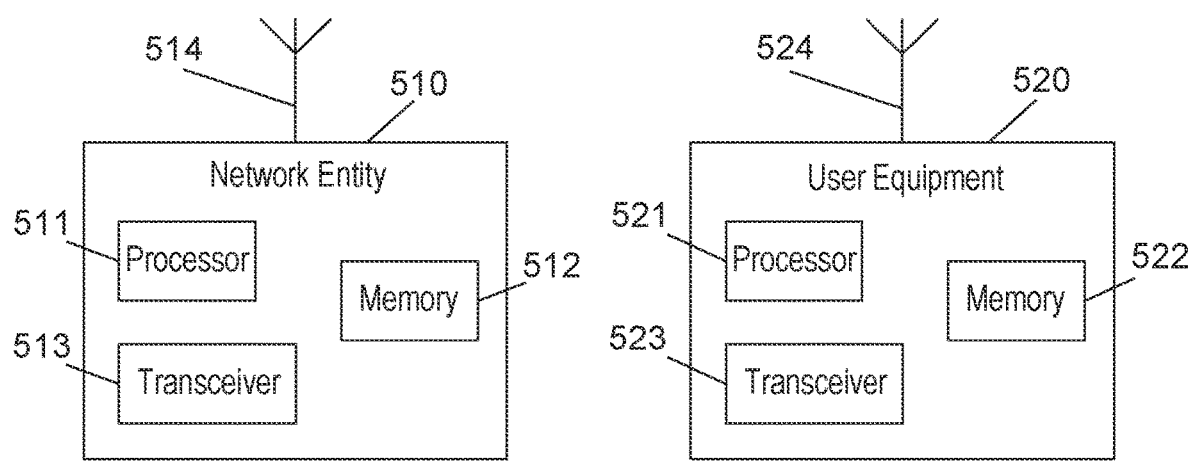
FIG. 5 illustrates an example of various network devices according to some example embodiments.

FIG. 2 illustrates an example of a signaling diagram depicting enabling a fast and dynamic control of data split over MP from a remote UE without causing a RRC reconfiguration of MP to the remote UE. NE 230 may be similar to NE 510, while remote UE 210 and relay UE 220 may both be similar to UE 520, as illustrated in FIG. 5, according to certain example embodiments.

At 201, remote UE 210 may be configured to communicate with NE 230 over a MP including a direct path, and an indirect path (e.g., SL) via relay UE 220.

At 202, NE 230 may configure remote UE 210 with a MP split radio bearer (RB) and an UL CG. The UL CG may be used to transmit UL data from the MP split RB over the direct path. The configuration may indicate that the activation/deactivation of the UL CG should control the split operation of the MP split RB. For example, the configuration may indicate whether remote UE 210 should transmit the UL data from the MP split RB over the direct path or indirect path based on the activation/deactivation status of the UL CG. In various example embodiments, NE 230 may transmit to remote UE 210 an RRC Reconfiguration message, which may include a UL CG and/or indication of a path control via CG (e.g., pathControlviaCG=True).

In certain example embodiments, an information element (IE), such as ConfiguredGrantConfig, may indicate that the configured CG is to be used for path control in the MP addressed, which may be configured as follows:

TABLE 1

Example Configured Grant Configuration (ConfiguredGrantConfig) IE

| Conditional Presence | Explanation |
| --- | --- |
| LCH-Based-Prioritization | This field is optionally present, Need R, if lch-BasedPrioritization is configured in the MAC entity. It is absent otherwise. |
| pathControl-viaCG | The field is optionally present if the path control via the activation/deactivation of the configured CG is enabled to the MAC entity. |
| RepTypeB | The field is optionally present if puschRep-TypeIndicator is set to pusch-RepTypeB, Need S, and absent otherwise. |
| CG-List | The field is mandatory present when included in configuredGrantConfigToAddModList-r16, otherwise the field is absent. |
| CG-Index-MAC | The field is mandatory present if at least one configured grant is configured by configuredGrant-ConfigToAddModList-r16 in any BWP of this MAC entity, otherwise it is optionally present, need R. |
| SRSsets | This field is mandatory present when UE is configured with two SRS sets configured in either srs-ResourceSetToAddModList or srs-Resource-SetToAddModListDCI-0-2 with usage codebook or non-codebook. Otherwise it is absent, Need R |

The BSR procedure may be used by UE 210 to provide NE 230 with information about UL data volume to be transmitted to NE 230. The RRC may configure various parameters to control the BSR, such as periodicBSR-Timer, retxBSR-Timer, logicalChannelSR-DelayTimerApplied, logicalChannelSR-DelayTimer, logicalChannelSR-Mask, logicalChannelGroup, logicalChannelGroup-IAB-Ext, sdt-LogicalChannelSR-DelayTimer, and pathControlviaCG.

If a regular BSR has been triggered, and/or logicalChannelSR-DelayTimer is not running, if there is no UL-shared channel (SCH) resource available for a new transmission; if the MAC entity is configured with UL configured grant(s) and the regular BSR was triggered for a logical channel for which logicalChannelSR-Mask is set to false; if the UL-SCH resources available for a new transmission do not meet the logical channel prioritization (LCP) mapping restrictions configured for the logical channel that triggered the BSR; or if pathControlviaCG is set to true and all UL CGs configured on this MAC entity are deactivated, a SR may be triggered.

Alternatively, if pathControlviaCG is set to true and an UL CG configured on this MAC entity is activated, a MAC entity may suspend the buffer status reporting procedure.

The configuration of the UL CG to remote UE 210 may be performed using RRC Reconfiguration (and L1 DCI over PDCCH) depending on type of UL CG from NE 230. RRC Reconfiguration may include ConfiguredGrantConfig IE for configuring the UL CG. The proposed pathControlviaCG may be introduced as a new IE of ConfiguredGrantConfig. The pathControlviaCG IE may be introduced to L1 signalling (i.e., as a part of DCI along the actual UL CG provided in DCI, or to L2 signalling MAC CE along with the activation/deactivation command).

At 203, NE 230 may determine whether the UL CG is to be activated or deactivated. At 204, NE 230 may transmit an activation/deactivation command (UL CG) to remote UE 210. In the example shown in FIG. 2, the UL CG configured to remote UE 210 has been deactivated; at 203, NE 230 may determine to activate the UL CG, and at 204, NE 230 may transmit an activation command to activate the UL CG to remote UE 210.

At 205, remote UE 210 may transmit data according to the activation command received from NE 230 at 204. For example, after receiving an activation command of the UL CG configured on the direct path from NE 230, remote UE 210 may transmit data by only using the UL CG over the direct path and SL resources over the indirect path, as shown at 206. It is noted that the UL CG may be used for UL transmissions of new data (e.g., first hybrid automatic repeat request (HARQ) transmissions since NE 230 may allocate resources and schedule for HARQ retransmissions dynamically). Additionally or alternatively, after receiving the activation command of the UL CG configured on the direct path from NE 230, remote UE 210 may use the direct path as the primary connection and the indirect path as the secondary connection. Thus, a dynamic primary-secondary connection switch based on actual resource allocation or use via fast and efficient activation/deactivation of the UL CG is enabled and in this case the existing data volume threshold based data split may be reused or applied.

In certain example embodiments, remote UE 210 may suspend a resource request procedure (e.g., SR/BSR for uplink resource to NE 210) over the direct path while using the UL CG, as shown at 205 for the example of FIG. 2. In this way, even if BSR/SR trigger condition (such as according to 3GPP TS 38.321) is satisfied, remote UE 210 may not trigger BSR/SR to request uplink resources over the direct path. Alternatively, remote UE 210 may not check whether the BSR/SR condition (such as according to 3GPP TS 38.321) is or is not satisfied if the resource request procedure for uplink resources over the direct path is suspended. This provides the advantages of allowing remote UE 210 to use the indirect path for better resource and power efficiency, and simplifying the operation of remote UE 210 over MP.

Alternatively (not shown in the example of FIG. 2), at 205, after receiving a deactivation command of the UL CG configured on the direct path from NE 230 at 204, remote UE 210 may use the indirect path up to the limit of the SL between remote UE 210 and relay UE 220 (e.g., as long as configured quality of service (QOS) constraints, such as maximum bit rate, are not exceeded and SL resources are available, and the direct path only for data exceeding the SL limit (if any)). In various example embodiments, remote UE 210 may also resume triggering and transmitting SR/BSR to NE 230 for dynamic scheduling of data exceeding the SL limit over the direct path. Additionally or alternatively, after receiving the deactivation command of the UL CG configured on the direct path from NE 230, remote UE 210 may use the direct path as the secondary connection and the indirect path as the primary connection. Thus, a dynamic primary-secondary connection switch based on actual resource allocation or use via fast and efficient activation/deactivation of the UL CG is enabled. In this case the existing data volume threshold based data split may be reused or applied.

At 206, remote UE 210 may transmit data of MP using only UL CG on the direct path and configured SL resources (e.g., resource pool(s) for SL transmissions in mode 2 or dedicated SL resources for SL transmissions in mode 1) on the indirect path.

In certain example embodiments, remote UE 210 may be configured to report channel busy rate (CBR) measured on individual resource pool(s) configured for SL transmissions on the indirect path over either the direct path or the indirect path depending on activation/deactivation of the UL CG as follows. The CBR may indicate the availability of SL resources for remote UE 210 to use for data transmissions over the indirect path. In some example embodiments, the CBR may be reported periodically by remote UE 210 when the UL CG is activated. In some example embodiments, the CBR may be reported together with SR/BSR when the UL CG is deactivated. In order to minimize additional overhead to SR/BSR, a short indication of CBR levels (e.g., high, medium, low) may be used.

In general, existing CBR reporting using RRC signalling may be used. However, new triggers/conditions for the reporting depending on activation/deactivation of the UL CG may be specified and configured to remote UE 210 with or without introducing a new IE. Furthermore, if the CBR is reported together with SR/BSR using MAC signalling when the UL CG is deactivated, a new IE may be introduced on MAC layer signalling.

In various example embodiments, there may be more than one resource pool configured to remote UE 210 for SL transmissions in mode 2. Thus, remote UE 210 may be configured to report CBR on each configured resource pool independently or to report an average CBR across all configured resource pools. Based on the reported CBR among other inputs, such as Uu and/or SL channel conditions (e.g., Uu reference signal received power (RSRP) or SL RSRP) of remote UE 210 and/or relay UE 220, NE 230 may determine to activate or deactivate the UL CG with remote UE 210. For example, NE 230 may activate the UL CG if the reported CBR is high (e.g., above a first threshold) or to deactivate the UL CG if the reported CBR is low (e.g., below a second threshold) when Uu and SL channel conditions of remote UE 210 and relay UE 220 are acceptable. Thus, when the channel conditions on the direct link and the indirect link (e.g., measured by Uu RSRP and SL RSRP at remote UE 210 and Uu RSRP at relay UE 220 and reported to NE 230 when Uu RSRP or SL RSRP dropped below a threshold) are above the respective thresholds, NE 230 may make a determination based only the reported CBR. Channel state information (CSI) measurement and reporting from remote UE 210 and relay UE 220 may be used in addition to, or alternatively to, RSRP.

Figure 3:
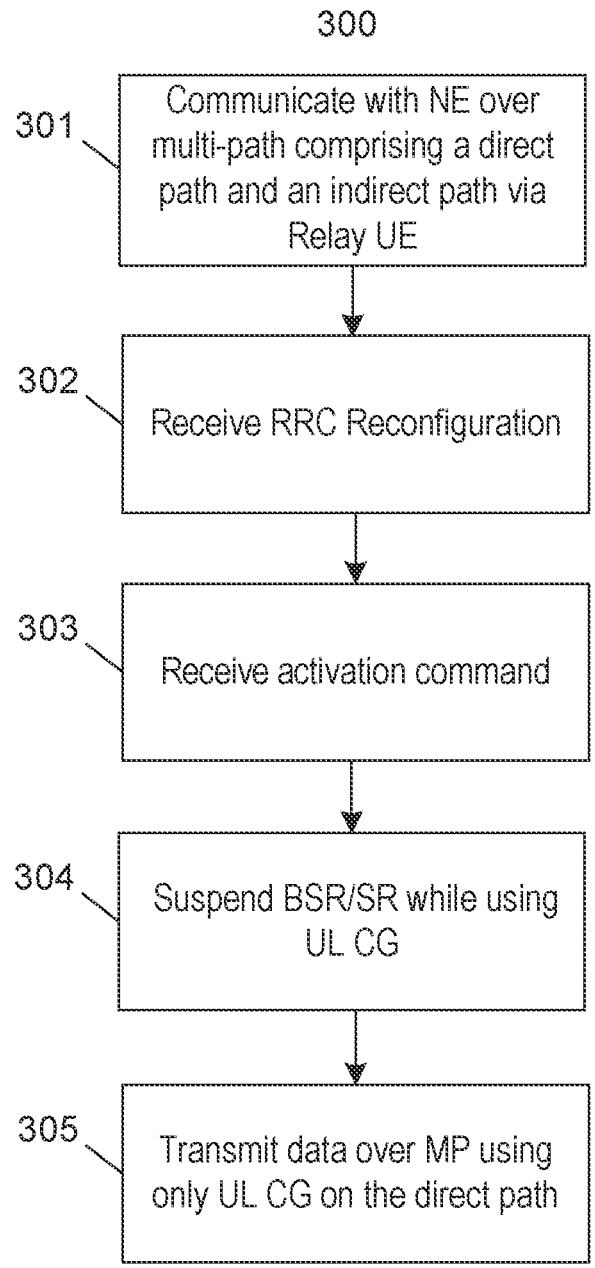
FIG. 3 illustrates an example of a flow diagram of a method that may be performed by a remote UE according to various example embodiments.

FIG. 3 illustrates an example of a flow diagram of a method for enabling a fast and dynamic control of data split over MP from a remote UE without causing a RRC reconfiguration of MP to the remote UE that may be performed by a UE, such as UE 520 illustrated in FIG. 5, according to various example embodiments.

At 301, the method may include communicating with a NE, such as NE 510 illustrated in FIG. 5, over a MP including a direct path and an indirect path via a relay UE, such as UE 520 illustrated in FIG. 5.

At 302, the method may include receiving a configuration with a MP split RB and an UL CG. The UL CG may be used for transmission of an UL data from the MP split RB over the direct path. The configuration may indicate that the activation/deactivation of the UL CG is to be used for controlling the split operation of the MP split RB. For example, the configuration may indicate whether the UE should transmit the UL data from the MP split RB over the direct path or indirect path based on the activation/deactivation status of the UL CG. In various example embodiments, the UE may receive from the NE an RRC Reconfiguration message, which may include a UL CG and/or indication of a path control via CG (e.g., pathControlviaCG True).

In certain example embodiments, an IE, such as ConfiguredGrantConfig, may indicate that the configured CG is to be used for path control in the MP addressed, which may be configured as shown in Table 1 above.

The BSR procedure may be used by the UE to provide the NE with information about UL data volume to be transmitted to the NE. The RRC may configure various parameters to control the BSR, such as periodicBSR-Timer, retxBSR-Timer, logicalChannelSR-DelayTimerApplied, logicalChannelSR-DelayTimer, logicalChannelSR-Mask, logicalChannelGroup, logicalChannelGroup-IAB-Ext, sdt-LogicalChannelSR-DelayTimer, and pathControlviaCG.

If a regular BSR has been triggered, and/or logicalChannelSR-DelayTimer is not running, if there is no UL-shared channel (SCH) resource available for a new transmission; if the MAC entity is configured with UL configured grant(s) and the regular BSR was triggered for a logical channel for which logicalChannelSR-Mask is set to false; if the UL-SCH resources available for a new transmission do not meet the logical channel prioritization (LCP) mapping restrictions configured for the logical channel that triggered the BSR; or if pathControlviaCG is set to true and all UL CGs configured on this MAC entity are deactivated, a SR may be triggered.

Alternatively, if pathControlviaCG is set to true and an UL CG configured on this MAC entity is activated, a MAC entity may suspend the buffer status reporting procedure.

The configuration of the UL CG may be performed using RRC Reconfiguration (and L1 DCI over PDCCH) depending on type of UL CG from the NE. RRC Reconfiguration may include ConfiguredGrantConfig IE for configuring the UL CG. The proposed pathControlviaCG may be introduced as a new IE of ConfiguredGrantConfig. The pathControlviaCG IE may be introduced to L1 signalling (i.e., as a part of DCI along the actual UL CG provided in DCI, or to L2 signalling MAC CE along with the activation/deactivation command).

At 303, the method may include receiving an activation/deactivation command (UL CG) from the NE. The example shown in FIG. 3 is for the case of the activation command.

At 304, the method may include transmitting data according to the activation command received from the NE at 303. For example, after receiving the activation command of the UL CG configured on the direct path from the NE, the method may include transmitting data by only using the UL CG over the direct path and SL resources (e.g., resource pool(s) for SL transmissions in mode 2 or dedicated SL resources for SL transmissions in mode 1) over the indirect path. It is noted that the UL CG may be used for UL transmissions of new data (e.g., first hybrid automatic repeat request (HARQ) transmissions since the NE may allocate resources and schedule for HARQ retransmissions dynamically). Additionally or alternatively, after receiving the activation command of the UL CG configured on the direct path from the NE, the remote UE may use the direct path as the primary connection and the indirect path as the secondary connection. Thus, a dynamic primary-secondary connection switch based on actual resource allocation or use via fast and efficient activation/deactivation of the UL CG is enabled. In this case, the existing data volume threshold based data split may be reused or applied.

In certain example embodiments, the method may include suspending a resource request procedure (e.g., SR/BSR for uplink resource to the NE) over the direct path while using the UL CG. In this way, even if BSR/SR trigger condition (such as according to 3GPP TS 38.321) is satisfied, the remote UE may not trigger BSR/SR to request uplink resources over the direct path. Alternatively, the remote UE may not check whether the BSR/SR condition (such as according to 3GPP TS 38.321) is or is not satisfied if the resource request procedure for uplink resources over the direct path is suspended. This provides the advantages of allowing the remote UE to use the indirect path for better resource and power efficiency, and simplifying the operation of the remote UE over MP.

Alternatively (not shown in the example of FIG. 3), at 304, after receiving a deactivation command of the UL CG configured on the direct path from the NE at 303, the remote UE may use the indirect path up to the limit of the SL between the remote UE and the relay UE (e.g., as long as configured QoS constraint such as maximum bit rate is not exceeded and SL resources are available, and the direct path only for data exceeding the SL limit (if any)). In various example embodiments, the remote UE may also resume triggering and transmitting SR/BSR to the NE for dynamic scheduling of data exceeding the SL limit over the direct path. Additionally or alternatively, after receiving the deactivation command of the UL CG configured on the direct path from the NE, the remote UE may use the direct path as the secondary connection and the indirect path as the primary connection. Thus, a dynamic primary-secondary connection switch based on actual resource allocation or use via fast and efficient activation/deactivation of the UL CG is enabled. In this case the existing data volume threshold based data split may be reused or applied.

At 305, the remote UE may transmit data of MP using only UL CG on the direct path and configured SL resources (e.g., resource pool(s) for SL transmissions in mode 2 or dedicated SL resources for SL transmissions in mode 1) on the indirect path.

In certain example embodiments, the remote UE may be configured to report channel busy rate (CBR) measured on individual resource pool(s) configured for SL transmissions on the indirect path over either the direct path or the indirect path depending on activation/deactivation of the UL CG as follows. The CBR may indicate the availability of SL resources for the remote UE to use for data transmissions over the indirect path. In some example embodiments, the CBR may be reported periodically by the remote UE when the UL CG is activated. In some example embodiments, the CBR may be reported together with SR/BSR when the UL CG is deactivated. In order to minimize additional overhead to SR/BSR, a short indication of CBR levels (e.g., high, medium, low) may be used.

In general, existing CBR reporting using RRC signalling may be used. However, new triggers/conditions for the reporting depending on activation/deactivation of the UL CG may be specified and configured to the remote UE with or without introducing a new IE. Furthermore, if the CBR is reported together with SR/BSR using MAC signalling when the UL CG is deactivated, a new IE may be introduced on MAC layer signalling.

In various example embodiments, there may be more than one resource pool configured to the remote UE for SL transmissions in mode 2. Thus, the remote UE may be configured to report CBR on each configured resource pool independently or to report an average CBR across all configured resource pools. Based on the reported CBR among other inputs, such as Uu and/or SL channel conditions (e.g., Uu RSRP or SL RSRP) of the remote UE and/or the relay UE, the NE may determine to activate or deactivate the UL CG to the remote UE. For example, the NE may activate the UL CG if the reported CBR is high (e.g., above a first threshold) or to deactivate the UL CG if the reported CBR is low (e.g., below a second threshold) when Uu and SL channel conditions of the remote UE and the relay UE are adequate. Thus, when the channel conditions on the direct link and the indirect link (e.g., measured by Uu RSRP and SL RSRP at the remote UE and Uu RSRP at the relay UE and reported to the NE when Uu RSRP or SL RSRP dropped below a threshold) are above the respective thresholds, the NE may make a determination based only the reported CBR. CSI measurement and reporting from the remote UE and the relay UE may be used in addition to, or alternatively to, RSRP.

Figure 4:
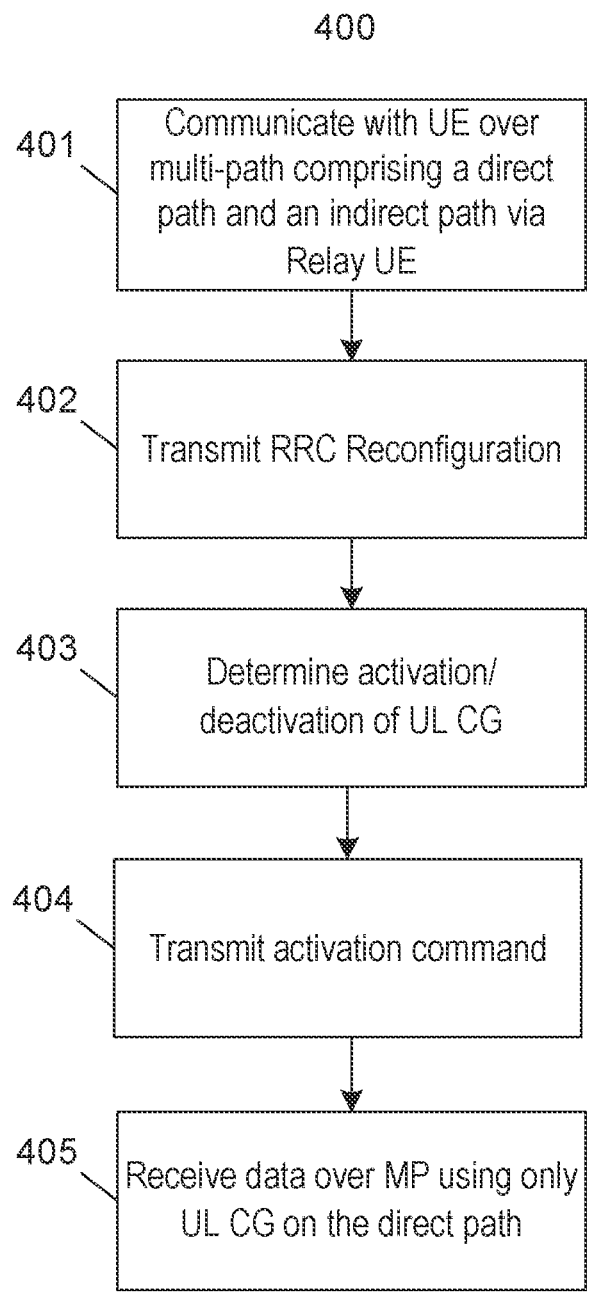
FIG. 4 illustrates an example of a flow diagram of a method that may be performed by a base station according to various example embodiments.

FIG. 4 illustrates an example of a flow diagram of a method for enabling a fast and dynamic control of data split over MP from a remote UE without causing a RRC reconfiguration of MP to the remote UE that may be performed by a NE, such as NE 510 illustrated in FIG. 5, according to various example embodiments.

At 401, the method may include communicating with a remote UE, such as UE 520 illustrated in FIG. 5, over a MP including a direct path and an indirect path via a relay UE, such as UE 520 illustrated in FIG. 5.

At 402, the method may include configuring the remote UE with a MP split RB and an UL CG. The UL CG may be used for transmission of an UL data from the MP split RB over the direct path. The configuration may indicate that the activation/deactivation of the UL CG is to be used for controlling the split operation of the MP split RB. For example, the configuration may indicate whether the remote UE should transmit the UL data from the MP split RB over the direct path or indirect path based on the activation/deactivation status of the UL CG. In various example embodiments, the method may include transmitting to the remote UE an RRC Reconfiguration message, which may include a UL CG and/or indication of a path control via CG (e.g., pathControlviaCG=True).

In certain example embodiments, an IE, such as ConfiguredGrantConfig, may indicate that the configured CG is to be used for path control in the MP addressed, which may be configured as shown in Table 1 above.

The BSR procedure may be used by the UE to provide the NE with information about UL data volume to be transmitted to the NE. The RRC may configure various parameters to control the BSR, such as periodicBSR-Timer, retxBSR-Timer, logicalChannelSR-DelayTimerApplied, logical-ChannelSR-DelayTimer, logicalChannelSR-Mask, logicalChannelGroup, logicalChannelGroup-IAB-Ext, sdt-LogicalChannelSR-DelayTimer, and pathControlviaCG.

If a regular BSR has been triggered, and/or logicalChannelSR-DelayTimer is not running, if there is no UL-shared channel (SCH) resource available for a new transmission; if the MAC entity is configured with UL configured grant(s) and the regular BSR was triggered for a logical channel for which logicalChannelSR-Mask is set to false; if the UL-SCH resources available for a new transmission do not meet the logical channel prioritization (LCP) mapping restrictions configured for the logical channel that triggered the BSR; or if pathControlviaCG is set to true and all UL CGs configured on this MAC entity are deactivated, a SR may be triggered.

Alternatively, if pathControlviaCG is set to true and an UL CG configured on this MAC entity is activated, a MAC entity may suspend the buffer status reporting procedure.

The configuration of the UL CG to the remote UE may be performed using RRC Reconfiguration (and L1 DCI over PDCCH) depending on type of UL CG from the NE. RRC Reconfiguration may include ConfiguredGrantConfig IE for configuring the UL CG. The proposed pathControlviaCG may be introduced as a new IE of ConfiguredGrantConfig. The pathControlviaCG IE may be introduced to L1 signalling (i.e., as a part of DCI along the actual UL CG provided in DCI, or to L2 signalling MAC CE along with the activation/deactivation command).

At 403, the method may include determining whether the UL CG is to be activated or deactivated. At 404, the method may include transmitting an activation/deactivation command (UL CG) to the remote UE. In the example shown in FIG. 4, it is considered that the UL CG configured to the remote UE has been deactivated and then at 403 the NE determines to activate the UL CG. At 404, the NE may transmit an activation command to activate the UL CG to the remote UE.

At 405, the method may include receiving data of MP using only UL CG on the direct path.

In certain example embodiments, the NE may receive report of CBR measured on individual resource pool(s) configured for SL transmissions on the indirect path from the remote UE over either the direct path or the indirect path depending on activation/deactivation of the UL CG as follows. The CBR may indicate the availability of SL resources for the remote UE to use for data transmissions over the indirect path. In some example embodiments, the CBR may be reported periodically by the remote UE and thus received by the NE when the UL CG is activated. In some example embodiments, the CBR may be reported together with SR/BSR when the UL CG is deactivated. In order to minimize additional overhead to SR/BSR, a short indication of CBR levels (e.g., high, medium, low) may be used.

In general, existing CBR reporting using RRC signalling may be used. However, new triggers/conditions for the reporting depending on activation/deactivation of the UL CG may be specified and configured to the remote UE with or without introducing a new IE. Furthermore, if the CBR is reported together with SR/BSR using MAC signalling when the UL CG is deactivated, a new IE may be introduced on MAC layer signalling.

In various example embodiments, there may be more than one resource pool configured to the remote UE for SL transmissions in mode 2. Thus, the remote UE may be configured to report CBR on each configured resource pool independently or to report an average CBR across all configured resource pools. Based on the reported CBR among other inputs, such as Uu and/or SL channel conditions (e.g., Uu RSRP or SL RSRP) of remote UE 210 and/or the relay UE, the NE may determine to activate or deactivate the UL CG to the remote UE. For example, the NE may activate the UL CG if the reported CBR is high (e.g., above a first threshold) or to deactivate the UL CG if the reported CBR is low (e.g., below a second threshold) when Uu and SL channel conditions of the remote UE and the relay UE are adequate. Thus, when the channel conditions on the direct link and the indirect link (e.g., measured by Uu RSRP and SL RSRP at the remote UE and Uu RSRP at the relay UE and reported to the NE when Uu RSRP or SL RSRP dropped below a threshold) are above the respective thresholds, the NE may make a determination based only the reported CBR. CSI measurement and reporting from the remote UE and the relay UE may be used in addition to, or alternatively to, RSRP.

FIG. 5 illustrates an example of a system according to certain example embodiments. In one example embodiment, a system may include multiple devices, such as, for example, NE 510 and/or UE 520.

NE 510 may be one or more of a base station (e.g., 3G UMTS NodeB, 4G LTE Evolved NodeB, or 5G NR Next Generation NodeB), a serving gateway, a server, and/or any other access node or combination thereof.

NE 510 may further include at least one gNB-centralized unit (CU), which may be associated with at least one gNB-distributed unit (DU). The at least one gNB-CU and the at least one gNB-DU may be in communication via at least one F1 interface, at least one $X_n$-C interface, and/or at least one NG interface via a $5^{th}$ generation core (5GC).

UE 520 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Furthermore, NE 510 and/or UE 520 may be one or more of a citizens broadband radio service device (CBSD).

NE 510 and/or UE 520 may include at least one processor, respectively indicated as 511 and 521. Processors 511 and 521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 512 and 522. The memory may be fixed or removable. The memory may include computer program instructions or computer code contained therein. Memories 512 and 522 may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 511 and 521, memories 512 and 522, and any subset thereof, may be configured to provide means corresponding to the various blocks of FIGS. 2-4. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple RATs. Other configurations of these devices, for example, may be provided. Transceivers 513 and 523 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 2-4). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 2-4. As used in this application, the term "circuitry" may refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 6:
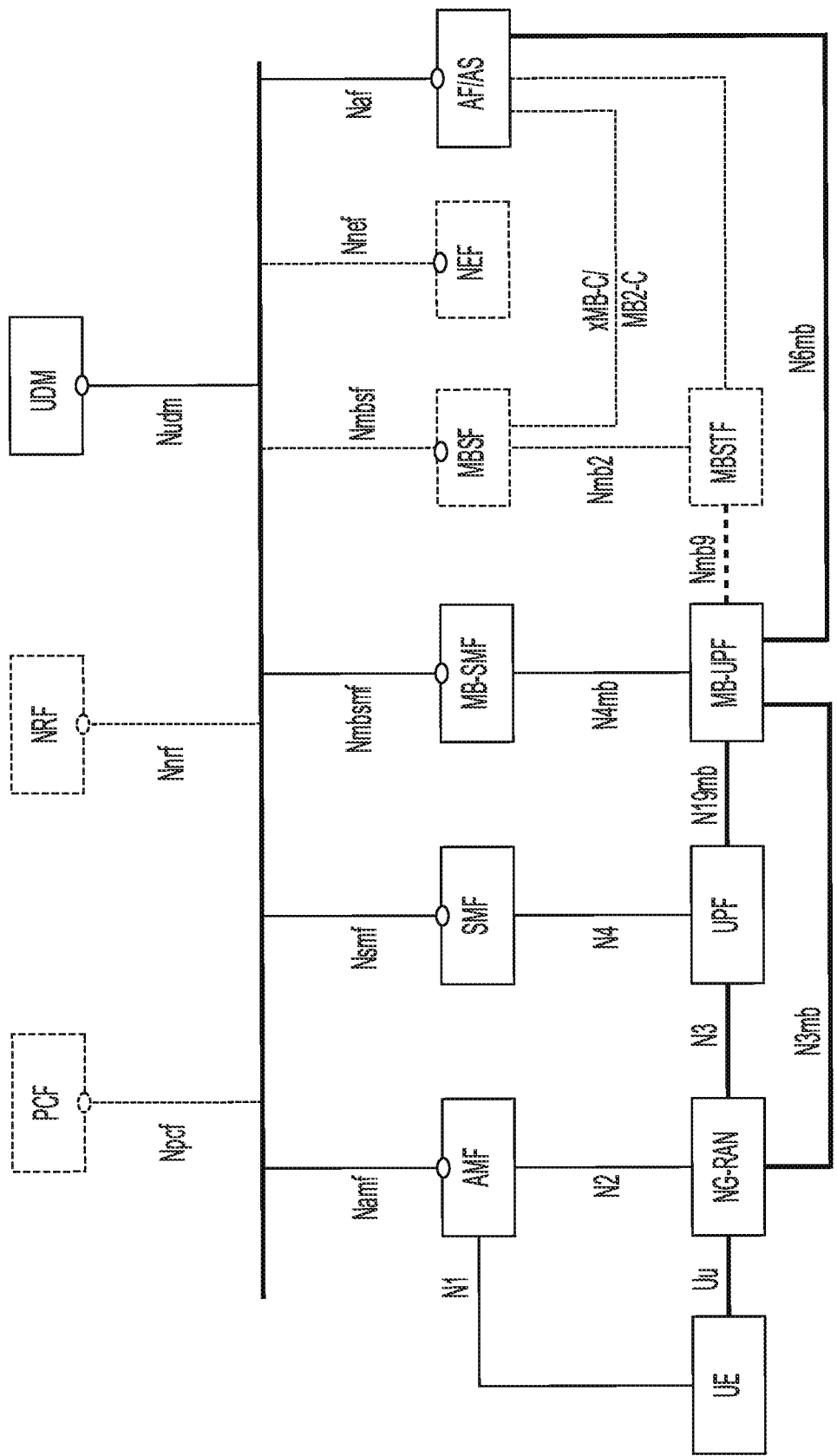
FIG. 6 illustrates an example of a 5G network and system architecture according to certain example embodiments.

FIG. 6 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 6 may be similar to NE 510 and UE 520, respectively. The user plane function (UPF) may provide services such as intra-RAT and inter-RAT mobility, routing and forwarding of data packets, inspection of packets, user plane quality of service (QOS) processing, buffering of downlink packets, and/or triggering of downlink data notifications. The application function (AF) may primarily interface with the core network to facilitate application usage of traffic routing and interact with the policy framework.

According to certain example embodiments, processors 511 and 521, and memories 512 and 522, may be included in or may form a part of processing circuitry or control circuitry. In addition, in some example embodiments, transceivers 513 and 523 may be included in or may form a part of transceiving circuitry.

In some example embodiments, an apparatus (e.g., NE 510 and/or UE 520) may include means for performing a method, a process, or any of the variants discussed herein. Examples of the means may include one or more processors, memory, controllers, transmitters, receivers, and/or computer program code for causing the performance of the operations.

In various example embodiments, apparatus 520 may be controlled by memory 522 and processor 521 to receive a message from a network entity including an indication of a path control via a configured grant, and, based at least in part on the indication of the path control via the configured grant, perform data transmission over at least one of a direct path with the network entity and an indirect path with the network entity via a relay user equipment.

Certain example embodiments may be directed to an apparatus that includes means for performing any of the methods described herein including, for example, means for receiving a message from a network entity including an indication of a path control via a configured grant, and means for, based at least in part on the indication of the path control via the configured grant, performing data transmission over at least one of a direct path with the network entity and an indirect path with the network entity via a relay user equipment.

In various example embodiments, apparatus 510 may be controlled by memory 512 and processor 511 to transmit a message to a remote user equipment including an indication of a path control via a configured grant, and receive, based at least in part on the indication of the path control via the configured grant, data transmission over at least one of a direct path with the remote user equipment and an indirect path with the remote user equipment via a relay user equipment.

Certain example embodiments may be directed to an apparatus that includes means for performing any of the methods described herein including, for example, means for transmitting a message to a remote user equipment including an indication of a path control via a configured grant, and means for receiving based at least in part on the indication of the path control via the configured grant, data transmission over at least one of a direct path with the remote user equipment and an indirect path with the remote user equipment via a relay user equipment.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

| Partial Glossary | |
|---|---|
| 3GPP | 3$^{rd}$ Generation Partnership Project |
| 5G | 5$^{th}$ Generation |
| 5GC | 5$^{th}$ Generation Core |
| 6G | 6$^{th}$ Generation |
| AF | Application Function |
| ASIC | Application Specific Integrated Circuit |
| BSR | Buffer Status Report |
| CBR | Channel Busy Rate |
| CBSD | Citizens Broadband Radio Service Device |
| CE | Control Elements |
| CG | Configured Grant |
| CN | Core Network |
| CPU | Central Processing Unit |
| CS | Configured Scheduling |
| CU | Centralized Unit |
| DCI | Downlink Control Information |
| DL | Downlink |
| DRB | Data Radio Bearer |
| DU | Distributed Unit |
| eMBB | Enhanced Mobile Broadband |
| eNB | Evolved Node B |
| FC | Flow Control |
| gNB | Next Generation Node B |
| GPS | Global Positioning System |
| HARQ | Hybrid Automatic Repeat Request |
| HDD | Hard Disk Drive |
| IE | Information Element |
| IoT | Internet of Things |
| L1 | Layer 1 |
| L2 | Layer 2 |
| LCP | Logical Channel Prioritization |
| LTE | Long-Term Evolution |
| LTE-A | Long-Term Evolution Advanced |
| MAC | Medium Access Control |
| MC | Multi-Connectivity |
| MEMS | Micro Electrical Mechanical System |
| MIMO | Multiple Input Multiple Output |
| mMTC | Massive Machine Type Communication |

-continued

Partial Glossary

| | |
|---|---|
| MP | Multi Path |
| NE | Network Entity |
| NG | Next Generation |
| NG-eNB | Next Generation Evolved Node B |
| NG-RAN | Next Generation Radio Access Network |
| NR | New Radio |
| NR-U | New Radio Unlicensed |
| PDA | Personal Digital Assistance |
| PDCP | Packet Data Convergence Protocol |
| PDCCH | Physical Downlink Control Channel |
| PDSCH | Physical Downlink Shared Channel |
| PSCCH | Physical Sidelink Control Channel |
| PSSCH | Physical Sidelink Shared Channel |
| PUSCH | Physical Uplink Shared Channel |
| QOS | Quality of Service |
| RAM | Random Access Memory |
| RAN | Radio Access Network |
| RAT | Radio Access Technology |
| RB | Radio Bearer |
| RF | Radio Frequency |
| RLC | Radio Link Control |
| RNTI | Radio Network Temporary Identifier |
| ROM | Read-Only Memory |
| RRC | Radio Resource Control |
| RSRP | Reference Signal Received Power |
| SCH | Shared Channel |
| SL | Sidelink |
| SR | Scheduling Request |
| TB | Transport Block |
| TBS | Transport Block Size |
| U2N | User Equipment to Network |
| U2U | User Equipment to User Equipment |
| UE | User Equipment |
| UL | Uplink |
| UMTS | Universal Mobile Telecommunications System |
| UPF | User Plane Function |
| URLLC | Ultra-Reliable and Low-Latency Communication |
| UTRAN | Universal Mobile Telecommunications System Terrestrial |
| WLAN | Wireless Local Area Network |
| XnAP | Xn Application Protocol |

We claim:

1. A method comprising:
    receiving, by a user equipment, a message from a network entity comprising an indication of a path control via a configured grant;
    based at least in part on the indication of the path control via the configured grant, performing, by the user equipment, data transmission over at least one of a direct path with the network entity and an indirect path with the network entity via a relay user equipment;
    receiving, by the user equipment, a command from the network entity for either activation or deactivation of an uplink configured grant; and
    transmitting, by the user equipment, multipath data from the multipath split radio bearer to the network entity using the indirect path as a primary connection and the direct path as a secondary connection after receiving the command from the network entity for the deactivation of the uplink configured grant.

2. The method of claim 1, wherein the configured grant comprises an uplink configured grant configured to enable the user equipment to transmit multipath data from the multipath split radio bearer of the user equipment over the direct path.

3. The method of claim 1, wherein the message indicates that an activation or deactivation of the uplink configured grant is used for performing data transmission of multipath data from the multipath split radio bearer over at least one of the direct path and the indirect path.

4. The method of claim 1, further comprising:
    transmitting, by the user equipment, multipath data from the multipath split radio bearer to the network entity using only the uplink configured grant over the direct path after receiving the command from the network entity for the activation of the uplink configured grant.

5. The method of claim 1, further comprising:
    suspending, by the user equipment, at least part of at least one of a buffer status report or scheduling request procedure between the user equipment to the network entity after receiving the command from the network entity for the activation of the uplink configured grant.

6. The method of claim 1, further comprising:
    transmitting, by the user equipment, multipath data from the multipath split radio bearer to the network entity using the direct path as the primary connection and the indirect path as the secondary connection after receiving the command from the network entity for the activation of the uplink configured grant.

7. The method of claim 1, further comprising:
    resuming, by the user equipment, at least part of at least one of a buffer status report or a scheduling request procedure between the user equipment and the network entity after receiving the command from the network entity for the deactivation of the uplink configured grant.

8. The method of claim 1, further comprising:
    reporting, by the user equipment, a channel busy rate measurement on at least one configured resource pool for sidelink transmission between the user equipment and the relay user equipment on the indirect path to the network entity periodically after receiving the command from the network entity for the activation of the uplink configured grant.

9. The method of claim 1, further comprising:
    reporting, by the user equipment, a channel busy rate measurement on at least one configured resource pool for sidelink transmission between the user equipment and the relay user equipment on the indirect path to the network entity when performing at least one of a buffer status report or a scheduling request procedure between the user equipment and the network entity after receiving the command from the network entity for the deactivation of the uplink configured grant.

10. A method comprising:
    transmitting, by a network entity, a message to a remote user equipment comprising an indication of a path control via a configured grant;
    receiving, by the network entity, based at least in part on the indication of the path control via the configured grant, data transmission over at least one of a direct path with the remote user equipment and an indirect path with the remote user equipment via a relay user equipment;
    transmitting, by the network entity, a command to the remote user equipment for either activation or deactivation of an uplink configured grant; and
    receiving, by the network entity, multipath data from the multipath split radio bearer of the remote user equipment using the indirect path as the primary connection and the direct path as the secondary connection after transmitting the command to the user equipment for the deactivation of the uplink configured grant.

11. The method of claim 10, wherein the configured grant comprises an uplink configured grant configured to transmit multipath data from thea multipath split radio bearer of the user equipment over the direct path.

12. The method of claim 10, wherein the message indicates that an activation or deactivation of the uplink configured grant is used for performing data transmission of multipath data from the multipath split radio bearer over at least one of the direct path and the indirect path.

13. The method of claim 10, further comprising:
receiving, by the network entity, multipath data from the multipath split radio bearer of the remote user equipment via only the uplink configured grant over the direct path after transmitting the command to the user equipment for the activation of the uplink configured grant.

14. The method of claim 10, further comprising:
receiving, by the network entity, multipath data from the multipath split radio bearer of the remote user equipment using the direct path as the primary connection and the indirect path as the secondary connection after transmitting the command to the user equipment for the activation of the uplink configured grant.

15. An apparatus comprising:
at least one processor; and
at least one memory storing instructions that, when executed by the at least one processor, cause the apparatus at least to:

receive a message from a network entity comprising an indication of a path control via a configured grant; and based at least in part on the indication of the path control via the configured grant, perform data transmission over at least one of a direct path with the network entity and an indirect path with the network entity via a relay user equipment;

receive a command from the network entity for either the activation or the deactivation of an uplink configured grant; and transmit multipath data from the multipath split radio bearer to the network entity using the indirect path as the primary connection and the direct path as the secondary connection after receiving the command from the network entity for the deactivation of the uplink configured grant.

16. The apparatus of claim 15, wherein the configured grant comprises an uplink configured grant configured to transmit multipath data from the multipath split radio bearer of the user equipment over the direct path.

* * * * *